United States Patent
Hosur et al.

(10) Patent No.: US 6,834,046 B1
(45) Date of Patent: Dec. 21, 2004

(54) ACQUISITION OF AN UNEVENLY SPACED SYNCHRONIZATION CHANNEL IN A WIRELESS COMMUNICATION SYSTEM

(75) Inventors: Srinath Hosur, Plano, TX (US); Sundararajan Sriram, Plano, TX (US); Timothy M. Schmidl, Dallas, TX (US); Anand G. Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 609 days.

(21) Appl. No.: 09/679,657

(22) Filed: Oct. 4, 2000

Related U.S. Application Data

(60) Provisional application No. 60/157,782, filed on Oct. 5, 1999.

(51) Int. Cl.$^7$ .............................................. H04B 7/216
(52) U.S. Cl. ..................... 370/335; 370/342; 370/503; 375/354
(58) Field of Search ................................ 570/503, 507, 570/508, 509, 512, 514, 516, 520, 294, 335, 342; 375/354, 362, 364

(56) References Cited

U.S. PATENT DOCUMENTS

| | | | | |
|---|---|---|---|---|
| 5,787,348 A | * | 7/1998 | Willey et al. ................ | 455/441 |
| 5,909,433 A | * | 6/1999 | Haartsen ...................... | 370/337 |
| 5,930,366 A | * | 7/1999 | Jamal et al. ................. | 370/509 |
| 6,144,650 A | * | 11/2000 | Watanabe et al. ............ | 370/335 |
| 6,363,060 B1 | * | 3/2002 | Sarkar ......................... | 370/342 |
| 6,385,264 B1 | * | 5/2002 | Terasawa et al. ............ | 375/371 |
| 6,480,558 B1 | * | 11/2002 | Ottosson et al. ............. | 375/350 |
| 6,504,830 B1 | * | 1/2003 | Ostberg et al. .............. | 370/342 |
| 6,665,277 B1 | * | 12/2003 | Sriram ........................ | 370/324 |
| 2002/0118705 A1 | * | 8/2002 | Sezgin et al. ................ | 370/503 |

* cited by examiner

*Primary Examiner*—Chau Nguyen
*Assistant Examiner*—Christine Ng
(74) *Attorney, Agent, or Firm*—Ronald O. Neerings; Wade James Brady, III; Frederick J. Telecky, Jr.

(57) ABSTRACT

A method (70) of operating a wireless receiver (UST). The method receives a wireless communicated signal, wherein the signal comprises asymmetrically spaced synchronization channel components. The method also defines (72) a set of signals from the communicated signal, wherein the set spans a number of equal duration time slots and comprises at least a first synchronization channel component and a second synchronization channel component. The method also forms (76) a first signal combination by combining a first portion of the set of signals with a second portion of the set of signals, and it forms (78) a second signal combination by combining a third portion of the set of signals with a fourth portion of the set of signals. Finally, the method detects (80, 82, 84) a location of the first synchronization channel component and a location of the second synchronization channel component in response to at least one of the first and second signal combinations.

37 Claims, 6 Drawing Sheets

ACQUISITION OF AN UNEVENLY SPACED SYNCHRONIZATION CHANNEL IN A WIRELESS COMMUNICATION SYSTEM

CROSS-REFERENCES TO RELATED APPLICATIONS

This application claims the benefit, under 35 U.S.C. §119(e)(1), of U.S. Provisional Application No. 60/157,782 (TI-29754PS), filed Oct. 5, 1999.

STATEMENT REGARDING FEDERALLY SPONSORED RESEARCH OR DEVELOPMENT

Not Applicable.

BACKGROUND OF THE INVENTION

The present embodiments relate to wireless communications systems and are more particularly directed to synchronizing a receiver to a transmitter in response to unevenly time-spaced synchronization signals between the transmitter and receiver.

Wireless communications have become prevalent in business, personal, and other applications, and as a result the technology for such communications continues to advance in various areas. One such advancement includes the use of spread spectrum communications, including that of code division multiple access ("CDMA"). In such communications, a user station (e.g., a hand held cellular phone) communicates with a base station, where typically the base station corresponds to a "cell." More particularly, CDMA systems are characterized by simultaneous transmission of different data signals over a common channel by assigning each signal a unique code. This unique code is matched with a code of a selected user station within the cell to determine the proper recipient of a data signal.

CDMA continues to advance along with corresponding standards that have brought forth a next generation wideband CDMA ("WCDMA"). WCDMA includes alternative methods of data transfer, one being time division duplex ("TDD") and another being frequency division duplex ("FDD"). The present embodiments apply by way of example to TDD and it is further introduced here. TDD data are transmitted as quadrature phase shift keyed ("QPSK") symbols in data packets of a predetermined duration or time slot within a frame. By way of illustration, such a prior art frame FR is shown in FIG. 1. Frame FR is a fixed duration, such as 10 milliseconds long, and it is divided into equal duration slots. In the past it was proposed in connection with the 3G standard that the number of these equal duration slots equals 16, while more recently the standard has been modified such that each frame includes 15 equal duration slots. Each of the 15 slots has a duration of approximately 667 microseconds (i.e., 10/15 milliseconds). For the sake of reference, 15 such slots are shown in FIG. 1 as $SL_1$ through $SL_{15}$, and slots $SL_1$ and $SL_8$ are expanded by way of examples to illustrate additional details. Within each TDD frame FR, bi-directional communications are permitted, that is, one or more of the slots within a frame may correspond to communications from a base station to a user station while other slots in the same frame may correspond to communications from a user station to a base station.

To accomplish the communication from a user station to a base station the user station must synchronize itself to a base station. This synchronization process is sometime referred to as acquisition of the synchronization channel and is often performed in various stages. The synchronization channel, shown in expanded form as SCH in FIG. 1, includes two codes, namely, a primary synchronization code ("PSC") and a secondary synchronization code ("SSC"), as transmitted from a base station. The PSC is presently a 256 length pseudo-noise ("PN") code. As shown in frame FR of FIG. 1 and by way of example of one TDD mode, both the PSC and SSC are included and transmitted in two slots for frame FR, namely, the first slot $SL_1$ and the eighth slot $SL_8$. Moreover, for each slot $SL_1$ and $SL_8$ containing the PSC and SSC, those codes may be offset by some period of time, $T_{offset}$, within the slot. Under the present standard, $T_{offset}$ is the same for both the PSC and the SSC. However, in alternative implementations, the PSC and SSC may be offset from one another, in which case it may be stated that the PSC has an offset $T_{offset1}$ from the slot boundary and the SSC has an offset $T_{offset2}$ from the slot boundary. For the sake of an example in the remainder of this document, assume that $T_{offset1} = T_{offset2}$. The PSC is transmitted with the same encoded information for numerous base stations while each base station group transmits a unique SSC. The actual base station is identified from the third stage of the synchronization process, which may involve correlating with the midamble (in TDD) or long code (in FDD) from the base station transmissions depending on the type of communication involved. The synchronization process typically occurs when a user station is initially turned on and also thereafter when the user station, if mobile, moves from one cell to another, where this movement and the accompanying signal transitions are referred to in the art as handoff. Synchronization is required because the user station does not previously have a set timing with respect to the base station and, thus, while slots are transmitted with respect to frame boundaries by the base station, those same slots arrive at the user station while the user station is initially uninformed of the frame boundaries among those slots. Consequently, the user station typically examines one frame-width of information (i.e., 15 slots), and from that information the user station attempts to determine the location of the actual beginning of the frame ("BOF"), as transmitted, where that BOF will be included somewhere within the examined frame-width of information. Further in this regard, the PSC is detected in a first acquisition stage, which thereby informs the user station of the periodic timing of the communications, and which may further assist as detailed later to identify the BOF. The SSC is detected in a later acquisition stage, which thereby informs the user station of the data location within the frame. Further, once the user station has detected a unique base station SSC, the user station also may identify the long code/midamble that is also unique to, and transmitted by, the base station, and following that determination a specific long code/midamble from that group is ascertained and which is then usable by the user station to demodulate data received in frames from the base station.

Returning now to frame FR in general and by way of particular focus to the preferred embodiments described later as well as the state of the art, note that each SCH is asymmetrically located within frame FR. More particularly, six non-synchronization slots follow the SCH in slot $SL_1$ while seven non-synchronization slots follow the SCH in slot $SL_8$. In other words, the location of the SCH (i.e., codes PSC and SSC) is unevenly spaced within frame FR. This asymmetry poses an issue to be addressed by the preferred embodiments, which is further appreciated by first looking to the previous 3G standard as discussed below.

Under the prior 3G standard, where recall there were 16 slots in a frame, then the SCH, as transmitted, also was located in the first and eighth slots of the frame. In order to locate these two SCH occurrences in the prior art, a user station could continuously sample 16 slots of received information and perform a PSC correlation on those samples, and by averaging those correlations to eliminate noise the synchronization channel would appear at the same slot locations within the average. For example, this technique may be implemented by applying the received information to a matched filter having the 256 length PN code of the PSC as coefficients to the filter. In this approach, the average peaks over time of those correlations correspond to the location of the synchronization channel within the collected information. However, while this approach locates the two SCH slots as corresponding to peaks within a sample of 16 slots, there is still an ambiguity whether a given peak corresponds to the originally-transmitted first or eighth slot within the frame. Thus, additional processing is required to resolve this ambiguity. Further, with the change of the 3G standard to an odd number (e.g., 15) of slots per frame, the above-described asymmetry is created. Thus, due to these factors, and also due to the lack of known timing between a transmitter and a receiver, the prior art approach does not provide a workable PSC acquisition for present applications.

In view of the above, there arises a need to provide an approach for acquisition of the PSC located asymmetrically within a wireless communication frame, as is achieved by the preferred embodiments discussed below.

BRIEF SUMMARY OF THE INVENTION

In the preferred embodiment, there is a method of operating a wireless receiver. The method receives a wireless communicated signal, wherein the signal comprises asymmetrically spaced synchronization channel components. The method also defines a set of signals from the communicated signal, wherein the set spans a number of equal duration time slots and comprises at least a first synchronization channel component and a second synchronization channel component. The method also forms a first signal combination by combining a first portion of the set of signals with a second portion of the set of signals, and it forms a second signal combination by combining a third portion of the set of signals with a fourth portion of the set of signals. Finally, the method detects a location of the first synchronization channel component and a location of the second synchronization channel component in response to at least one of the first and second signal combinations. Other circuits, systems, and methods are also disclosed and claimed.

DETAILED DESCRIPTION OF THE INVENTION

Figure 1:
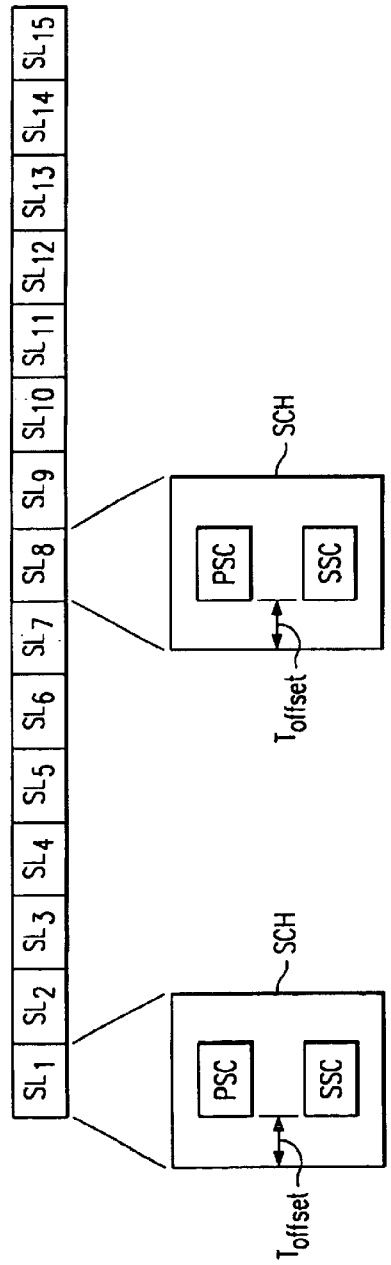
FIG. 1 illustrates a prior art frame FR divided into an odd number of equal-duration slots.

FIG. 1 was described in the Background Of The Invention section of this document and the reader is assumed familiar with the concepts described in that section.

Figure 2:
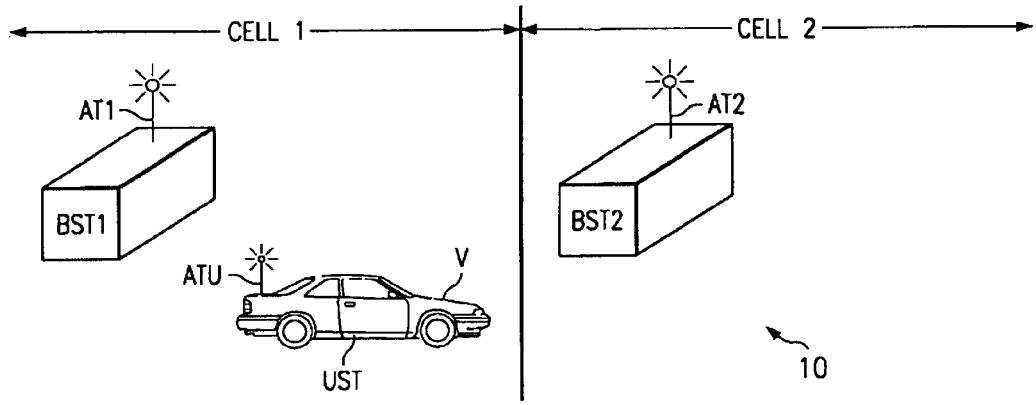
FIG. 2 illustrates a diagram of a cellular communications system 10 by way of a contemporary code division multiple access ("CDMA") or wideband CDMA ("WCDMA") example in which the preferred embodiments operate.

FIG. 2 illustrates a diagram of a cellular communications system 10 by way of a contemporary code division multiple access ("CDMA") or wideband CDMA ("WCDMA") example in which the preferred embodiments operate. Within system 10 are shown two base stations BST1 and BST2. Each base station BST1 and BST2 includes a respective antenna AT1 and AT2 from which each may transmit or receive CDMA signals. The general area of intended reach of each base station defines a corresponding cell; thus, base station BST1 is intended to generally communicate with cellular devices within Cell 1 while base station BST2 is intended to generally communicate with cellular devices within Cell 2. Of course, some overlap between the communication reach of Cells 1 and 2 exists by design to support continuous communications should a communication station move from one cell to the other. Indeed, further in this regard, system 10 also includes a user station UST, which is shown in connection with a vehicle V to demonstrate that user station UST is mobile. In addition, by way of example user station UST includes a single antenna ATU for both transmitting and receiving cellular communications.

In some respects, system 10 may operate according to known general techniques for various types of cellular or other spread spectrum communications, including CDMA communications. Such general techniques are known in the art and include the commencement of a call from user station UST and the handling of that call by either or both of base stations BST1 and BST2. Other techniques are ascertainable by one skilled in the art.

One aspect that is particularly relevant to the present inventive scope relates to synchronization of user station UST with respect to a base station BST1 or BST2 (or still others not shown). Such synchronization may occur either at start up or during handoff, which occurs when user station UST moves from one cell to another. In either of these cases or possibly others, the preferred embodiment relates to primary synchronization code ("PSC") transmissions by base stations BST1 and BST2 and the detection of that code by user station UST. Once the PSC is detected, other acquisition stages may be performed, such as acquiring the secondary synchronization code ("SSC"), the long code group, and the particular long code/midamble corresponding to the specific base station, and then demodulating data from the base station using the ascertained base station long code. Given the preceding, the preferred embodiments are directed to improving the acquisition of a PSC from a base station by a user station, as further detailed below.

Figure 3:
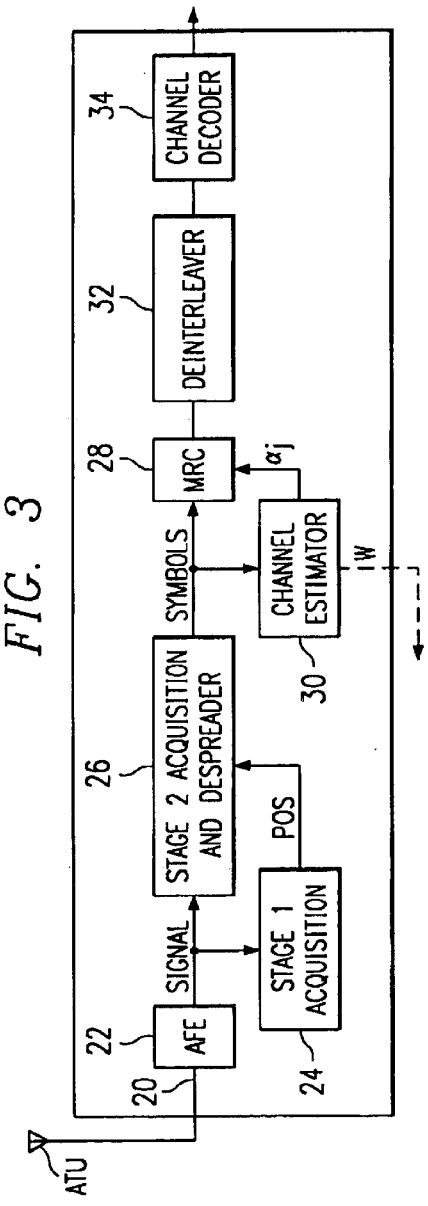
FIG. 3 illustrates a first preferred embodiment of user station UST from FIG. 2 in greater detail.

FIG. 3 illustrates a first preferred embodiment of user station UST in greater detail, and in which a preferred method for synchronization channel acquisition is implemented as further discussed below. By way of introduction, user station UST is shown in block diagram form where given the following discussion one skilled in the art may ascertain various different circuits and combined software and/or firmware techniques for implementing the blocks of user station UST. Further, the various blocks shown are separated to facilitate an understanding of the preferred embodiments and not by way of limitation and, thus, one skilled in the art may add other functionality to such blocks or further subdivide or combine the functions detailed below. Also, for the sake of presentation, the following discussion first examines the functionality of each block generally with some of this functionality detailed further later.

Looking to various connections in FIG. 3, antenna ATU of user station UST is for receiving communications from one or more base stations (e.g., from transmit antennas AT1 and AT2 of base stations BST1 and BST2). Within user station UST, signals received by antenna ATU are connected to an input 20, and input 20 is connected to an analog front end ("AFE") block 22. Since transmissions from each of base stations BST1 and BST2 are modulated over a radio frequency, AFE block 22 includes circuitry directed to those radio frequency modulated signals. For example, AFE block 22 includes a signal down converter to remove the radio frequency modulation, thereby providing a resulting analog signal. As another example, AFE block 22 includes analog-to-digital circuitry for converting the down-converted analog signal into a digital signal counterpart. This digital signal counterpart is output from AFE block 22 to a stage 1 acquisition block 24 and to a stage 2 acquisition and despreader block 26.

In the preferred embodiment and as detailed in additional Figures later, stage 1 acquisition block 24 acquires the PSC in the synchronization channel embedded within the digital signal provided by AFE block 22. As a result, stage 1 acquisition block 24 outputs a parameter POS to stage 2 acquisition and despreader block 26. As discussed later, POS may indicate one or more positions to stage 2 acquisition and despreader block 26 depending on which of various embodiments are implemented. In any event, generally the one or more positions identified by the parameter POS are those slots in the digital signal which are perceived by block 24 to contain the synchronization channel.

Stage 2 acquisition and despreader block 26 receives the analog signal from AFE block 22 and completes the acquisition of the synchronization channel in response to the POS parameter from stage 1 acquisition block 24. The completion of the synchronization channel acquisition in part responds to the POS parameter according to the preferred embodiments. Further, the completion of the acquisition of the synchronization channel also may include various of the steps associated with the prior art, such as detecting the SSC, identifying the group of long codes/midambles from the transmitting base station (i.e., BST1 or BST2), ascertaining the specific long code for that base station, and demodulating the signal in response to that specific long code. In addition, the despreading aspect of block 26 operates according to known principles, such as by multiplying the CDMA signal times the CDMA code for user station UST and thereby producing a despread symbol stream at its output and at the symbol rate. The despread signals output by block 26 are coupled by way of an example to an MRC block 28 and also to a channel estimator 30. Channel estimator 30 determines estimated channel impulse responses based on the incoming despread symbols. Channel estimator 30 provides these estimated channel impulse responses, illustrated in FIG. 3 as $\alpha_i$, to MRC block 28. Further, user station UST is shown by way of example as an open loop system; however, the present teachings also could be implemented in an alternative embodiment using closed loop technology, in which case channel estimator 30 also would output the estimates $\alpha_i$, or values derived from those estimates such as a weight vector W, to a feedback channel for communication back to the base station that is transmitting to user station UST. To illustrate this aspect as an option, such a feedback line is shown in FIG. 3 as a dashed line. In any event, returning to the open loop example of FIG. 3 and the communication of the channel estimates to MRC block 28, in response MRC block 28 applies the estimates to the despread symbols received from the despreading aspect of block 26. Further in this regard and although not separately shown, the MRC operation may be by way of various methods, such as using a rake receiver to combine each of the estimate-adjusted paths. Lastly, note that MRC block 28 is only one example of a type of processing in response to the channel estimates; in other embodiments, one can use the channel estimates and the despread signals corresponding to not just the desired user but also other users to perform multi-user detection/interference cancellation.

Following MRC block 28 in FIG. 3 are additional blocks/functions known in the art. For example, MRC block 28 outputs its result to a deinterleaver 32 which operates to perform an inverse of the function of an interleaver that is typically included in base stations BST1 and BST2. Such an interleaver operates with respect to a block of encoded bits and shuffles the ordering of those bits so that the combination of this operation with an encoding operation exploits the time diversity of the information. For example, one shuffling technique that may be performed by such an interleaver is to receive bits in a matrix fashion such that bits are received into a matrix in a row-by-row fashion, and then those bits are output for further processing by the base station. In any event, therefore, deinterleaver 32 effectively operates in an opposite fashion to remove the effects on the symbols that were imposed by the corresponding base station interleaver. The output of deinterleaver 32 is connected to a channel decoder 34. Channel decoder 34 may include a Viterbi decoder, a turbo decoder, a block decoder (e.g., Reed-Solomon decoding), a combination of decoding techniques, or still other appropriate decoding schemes as known in the art. In any event, channel decoder 34 further decodes the data received at its input, typically operating with respect to certain error correcting codes, and it outputs a resulting stream of decoded symbols. Indeed, note that the probability of error for data output from channel decoder 34 is far less than that before processing by channel decoder 34. For example, under current standards, the probability of error in the output of channel decoder 34 may be between $10^{-3}$ and $10^{-6}$. Finally, the decoded symbol stream output by channel decoder 34 may be received and processed by additional circuitry in user station UST, although such circuitry is not shown in FIG. 3 so as to simplify the present illustration and discussion.

Figure 4:
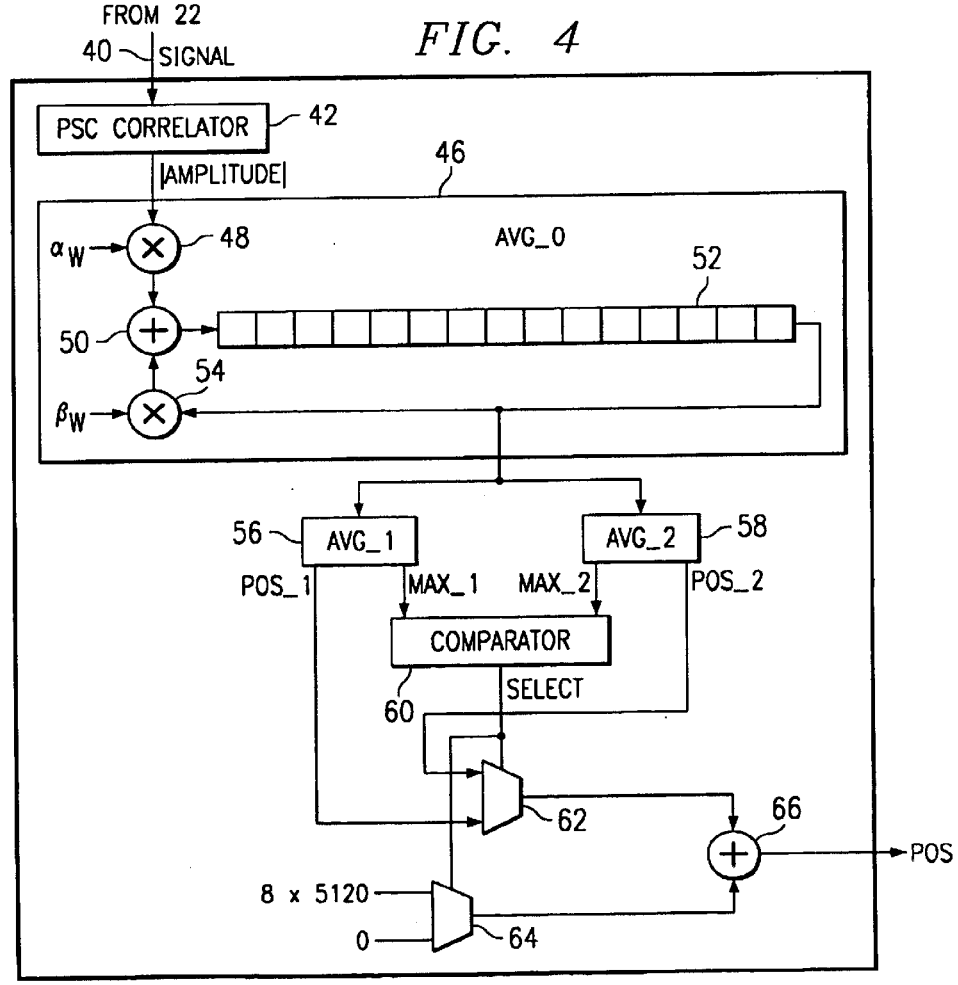
FIG. 4 illustrates, in greater detail, a block diagram of stage 1 acquisition block 24 from FIG. 3.

FIG. 4 illustrates, in greater detail, a block diagram of stage 1 acquisition block 24 from FIG. 3, where the following discussion again is directed to the functionality of the blocks and with it understood that one skilled in the art may implement such blocks in various forms to achieve the stated functionality. The digital frame signal from AFE block 22 is connected to an input 40 which connects the digital signal to a PSC correlator 42. PSC correlator 42 correlates the known PSC with one frame width of information from the incoming digital signal, and this determination may be achieved by way of example using a matched filter having the PSC as its coefficients. Preferably, the number of correlations measured per frame are based on the sample rate of user station UST and the chip rate for the wireless communication; for example, in one approach the number of correlations per frame (i.e., 10 milliseconds) may be the product of the sample rate (e.g., twice per chip) and chip rate (e.g., 3.84 Mcps) and may be on the order of 76,800 PSC correlation measures. However, in alternative embodiments a reduced or different number of PSC correlations measures may be made per frame. In any event, PSC correlator 42 therefore provides a time-dependent signal representing the correlation measures of the PSC to the evaluated frame-width of signal. In the preferred embodiment, the energy (e.g., typically the absolute value of the magnitude squared) of these correlation measures is output by PSC correlator 42, and examples of such output signals are detailed later. The output from PSC correlator 42 is connected to an input 44 of a first averaging block 46 block.

First averaging block 46 computes a first average designated for sake of reference in this document as AVG_0. With respect to items within block 46, its input 44 is connected as a first multiplicand to a first multiplier 48 which also receives a weight value, $\alpha_w$, as a second multiplicand. The output of first multiplier 48 is connected as a first addend to an adder 50, and the output of adder 50 is connected to a buffer 52. Buffer 52 is preferably of sufficient size to store one frame width (i.e., 15 slots) worth of information received at its input, and as detailed below such information corresponds to a set of PSC correlation measures by correlator 42 as well as an average based on successive sets of those measures. The output of buffer 52 is fed back to provide a first multiplicand to a second multiplier 54, which also receives a weight value, $\beta_w$, as a second multiplicand. The output of second multiplier 54 is connected as a second addend to adder 50. Additionally, the output of buffer 52 provides the average value AVG_0 to two additional average circuits 56 and 58.

Each of average circuits 56 and 58 operates to compute an average in response to AVG_0 and according to respective methodologies detailed below. For sake of reference, the average computed by average circuit 56 is referred to as AVG_1 and the average computed by average circuit 58 is referred to as AVG_2. In the preferred embodiment, both AVG_1 and AVG_2 are determined by combining a first portion of AVG_0 with a second portion of AVG_0, where the selection of those portions differs for circuits 56 and 58 and, thus, the differences in those selected portions also causes different values to be determined for AVG_1 and AVG_2. In any event, since the averaging operations by circuits 56 and 58 are related to AVG_0 which will include various peaks along its time-dependent positions, then the respective average values determined by circuits 56 and 58 also will include peaks within each computed average. Further in this regard, for each computed average AVG_1 and AVG_2, each of average circuits 56 and 58 outputs a magnitude of the largest peak within its respective average as well as the position of that peak within the average. For sake of reference, the peak magnitude from average circuit 56 is referred to as MAX_1 and its position is referred to as POS_1. Similarly, the peak magnitude from average circuit 58 is referred to as MAX_2 and its position is referred to as POS_2. Lastly, note that positions POS_1 and POS_2 are readily determined from a counter which advances as each PSC correlation sample is taken so that the count at any given time identifies the position of the corresponding sample.

In the embodiment illustrated in FIG. 4, both MAX_1 and MAX_2 are connected as inputs to a comparator 60, which outputs a SELECT signal that has its state based on which of its two input values MAX_1 and MAX_2 is a maximum. The SELECT signal is connected as a select input to a multiplexer 62 and to a multiplexer 64. Multiplexer 62 is also connected to receive the position values POS_1 and POS_2 as data inputs, while multiplexer 64 receives two fixed values as inputs, namely, 0 and 8 times 5,120 (i.e., 40,960) by way of example, where other values may be input based on sampling rate and so forth as further appreciated below. The outputs of multiplexers 62 and 64 are connected as addend inputs to an adder 66, and the output of adder 66 outputs the POS signal shown in both FIG. 4 and FIG. 3, where in FIG. 3 recall that the POS signal is connected to stage 2 acquisition and despreader block 26. For reasons detailed later, if MAX_1 is larger than MAX_2, then SELECT is asserted in a manner such that multiplexer 62 outputs the value of POS_1 and multiplexer 64 outputs the value of 0, whereas if MAX_2 is larger than MAX_1, then SELECT is asserted in a manner such that multiplexer 62 outputs the value of POS_2 and multiplexer 64 outputs the value of 8×5,120.

Figure 5:
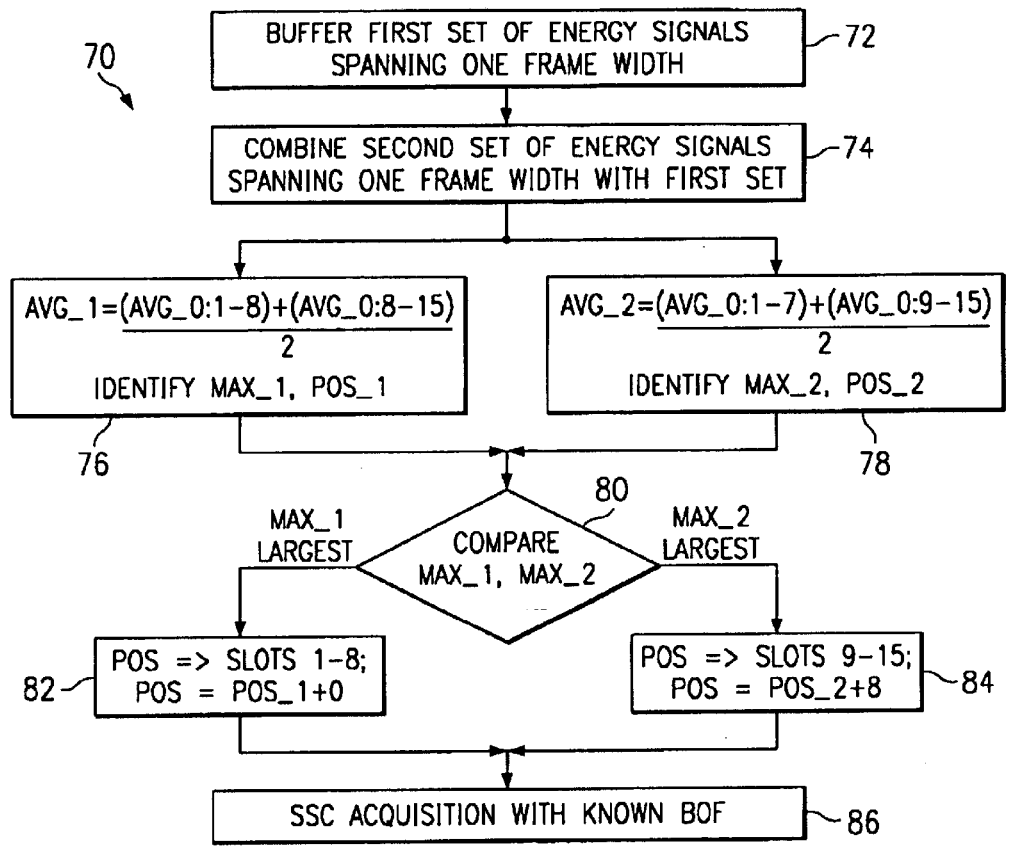
FIG. 5 illustrates a method 70 of operation of stage 1 acquisition block 24 and the stage 2 acquisition of block 26 of FIG. 4.

FIG. 5 illustrates a method 70 of operation of stage 1 acquisition block 24 of FIG. 4. Method 70 begins with a step 72 where buffer 52 stores a first set of energy signals from PSC correlator 42, where preferably the set spans the number of slots (e.g., 15) in one frame. Note that this first set of energy signals passes through multiplier 48, and to simplify the present example assume that no weight adjustment is made, that is, assume $\alpha_w=1$. Further, because the signal set from step 72 is a first sample, than it is a sole addend into adder 50 and it directly passes to buffer 52 with no further signal added to it by adder 50.

Figure 6:
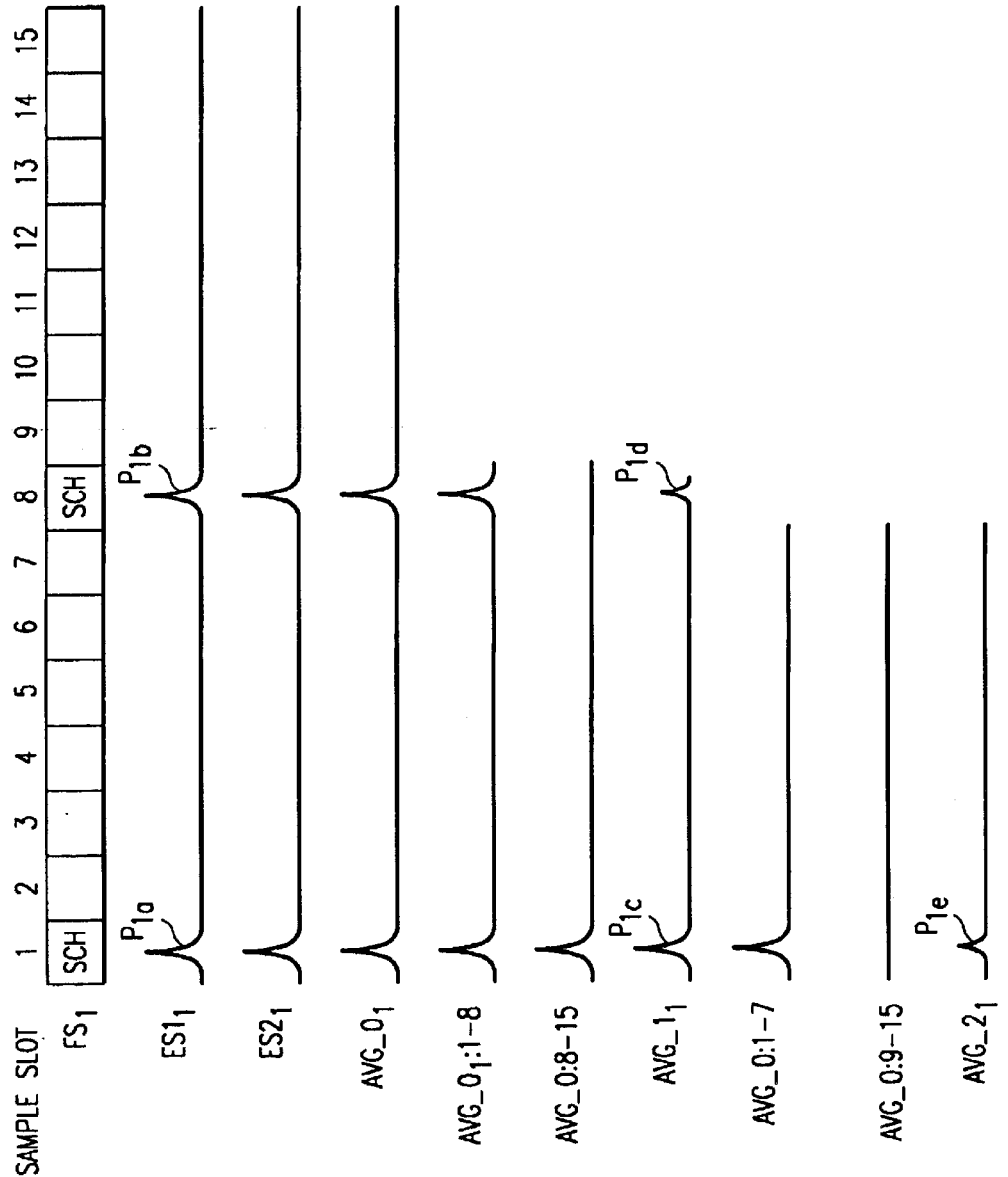
FIG. 6 illustrates a first example of signals processed according to the preferred embodiment method of FIG. 5.

To further illustrate step 72 and to facilitate a discussion of the remaining steps of method 70, FIG. 6 illustrates an example of one frame-sized set $FS_1$ of energy signals thereby spanning 15 slots for the example of the preferred embodiment. In other words, for the example of FIG. 6 and recalling that buffer 52 stores the PSC correlation measures for one frame width of information, then assume that the frame width considered for step 72 is those 15 sample slots illustrated in FIG. 6. Note that the terminology "sample slot" is chosen to provide a timing reference for when the sample is taken by user station UST; however, because at this point in the method there is no known timing relationship between user station UST and the base station that transmitted the sampled frame, then the location of data within sample slot positions likely differs from the location that each data was transmitted in an actual slot by the base station. In the example of FIG. 6, the synchronization channel (shown as "SCH") as received is located in sample slots 1 and 8 of $FS_1$. Thus, the two instances of SCH are unevenly located within the 15 slots of $FS_1$ in that the SCH in sample slot 1 is followed by six non-synchronization channel slots while the SCH in sample slot 8 is followed by seven non-synchronization channel slots. Further, at the point at which $FS_1$ is received, there is an ambiguity as to whether the SCH in sample slot 1 or the SCH in sample slot 8 represents the actual first SCH transmitted in a given frame by the base station. In other words, it is known in the art that under a given TDD mode the base station will transmit the SCH twice per frame, and under this mode, the second SCH is transmitted seven slots after the first SCH. For example, often, the first SCH in a given frame is at the beginning of the frame ("BOF"), that is, in slot 1 of the frame and, thus, the second SCH in this case will be in slot 8 of the frame. However, in other cases, the first SCH may be transmitted in a slot other than the first slot, but also in this case again the second SCH in that frame will be transmitted seven slots after the first slot. In any event, when an SCH is received by user station UST, there is an ambiguity as to whether that SCH is in fact the first SCH originally transmitted in a frame or it is in fact the second SCH originally transmitted in a frame. This ambiguity, however, is resolved by the preferred embodiment as appreciated from the remaining discussion.

To further illustrate step 72, FIG. 6 also illustrates an energy signal $ES1_1$, where $ES1_1$ is intended to depict the set of energy values stored by buffer 52 as generated from the PSC correlation by correlator 42 with respect to $FS_1$; in other words, assuming no noise in the signal and the resulting PSC correlation, then $ES1_1$ as stored by buffer 52 has two peaks $P_{1a}$ and $P_{1b}$ corresponding in time to the SCH located in sample slots 1 and 8 of $FS_1$. Further, for sake of simplification, energy signal $ES1_1$, as well as other energy signals illustrated later, are shown as having a single peak, if any, centered per sample slot whereas in actuality many PSC correlation samples per sample slot are taken (e.g., 5,120) and, thus, many other peaks could occur within a same sample slot or different sample slots, and various peaks also may not necessarily be centered within a sample slot. In other words, note further that an SCH as transmitted by a base station need not be centered in a slot and, indeed, it may be transmitted at any chip position within a slot. Moreover, because the user station when first receiving the signal does not have a known timing with respect to the base station, then the SCH may appear at any chip within a slot as perceived by the user station. In other words, assume by way of an example that the base station transmits the SCH in slots 1 and 8 and at the first chip position of each of those slots, and assume also that user station UST has S samples per slot (i.e., in one frame it has 15S samples). Now since user station UST does not have any time information of the time reference of the base station and due to other delays etc., the SCH will be received at positions mod(1,15S) and mod(1+ 8S,15S). The value "1" is the offset between the user station's perceived frame position and the actual frame position. One skilled in the art may therefore appreciate from this illustration that the first SSC position received by user station in a frame can actually belong to the second SSC being transmitted by the base station.

Returning to FIG. 5, following step 72, method 70 continues to step 74. In step 74, buffer 52 combines a second frame-sized set of energy signals from PSC correlator 42 with the set it stored from step 72. Again to simplify the present example, assume that this second set of signals passes through multiplier 48 with $\alpha_w=1$ (i.e., no weighting). Further, this second set is combined with the first set by feeding back the first set from buffer 52, through multiplier 54, to be added by adder 50 the second set. Also, again for simplification, assume that $\beta_w=1$ such that multiplier 54 does not weight the first sample set as it passes through that multiplier. To further illustrate step 74, FIG. 6 also illustrates the second set of energy signals as $ES2_1$, which is combined into buffer 52 with $ES1_1$ from step 72. Note that the terminology that the two sets of signals are combined is used to indicate that the sets of signals may be merged with one another using various approaches. For example, the two could be only added to one another. As another example, the two could be directly averaged, that is, the sum of the two may be divided by two. As still another example, either $ES1_1$ or $ES2_1$ may be weighted by adjusting the values of $\alpha_w$ and $\beta_w$ as desired by one skilled in the art to perform various types of scaled averaging, where one preferable type of scaling may be single pole averaging whereby the most recent sample set (e.g., $ES2_1$) is given greater weight than a previous sample set (e.g., $ES1_1$). In any event, the combination of two successive sample sets is referred to by way of reference, but not by limitation, as an average, and is designated as AVG_0. To illustrate an example, assume that AVG_0 is the sum of two successive samples divided by two; further, FIG. 6a illustrates such an average with respect to $ES1_1$ and $ES2_1$ and designated as $AVG\_0_1$. Because the present example is an ideal case with no noise, multipath, or other delays, then $ES1_1$ and $ES2_1$ are identical and, hence, the average $AVG\_0_1$ merely appears to be the same as either one of $ES1_1$ and $ES2_1$. In actuality, however, $ES1_1$ and $ES2_1$ may differ to various degrees and include some level of noise, but the combination achieved in $AVG\_0_1$ will remove some of these effects. In any event, after step 74, method 70 continues with two steps 76 and 78 that may occur at the same time and, hence, are shown in parallel fashion in FIG. 5. Each of steps 76 and 78 is discussed below.

Step 76 computes AVG_1, and recall that AVG_1 is formed by combining a first portion of AVG_0 with a second portion of AVG_0. In the preferred embodiment, this combination is an average of the values of AVG_0 in its sample slot positions 1–8 with the values of AVG_0 in its sample slot positions 8–15, that is, the set of energy signals corresponding to sample slot positions 1–8 are added to the set of energy signals corresponding to sample slot positions 8–15, and the sums are divided by two (although again, other averaging techniques may be used). FIG. 6 further illustrates the operation of step 76 with respect to the example of $AVG\_0_1$ to thereby produce an example of AVG_1 shown as $AVG\_1_1$. Particularly, FIG. 6 first illustrates the signals at sample slot positions 1–8 of $AVG\_0_1$, abbreviated in FIG. 6 as $AVG\_0_1$:1–8, followed by the signals at sample slot positions 8–15 of $AVG\_0_1$, abbreviated in FIG. 6 as $AVG\_0_1$:8–15. Below those signals is the average of those signals, thereby forming $AVG\_1_1$. For purposes of later discussion, note that $AVG\_1_1$ includes two peaks, $P_{1c}$ and $P_{1d}$, where $P_{1c}$ is greater than $P_{1d}$ (by a factor of two in the illustrated ideal case).

Step 78 computes AVG_2, where AVG_2 is also formed by combining a first portion of AVG_0 with a second portion of AVG_0. In the preferred embodiment, this combination is an average of the values of AVG_0 in its sample slot positions 1–7 with the values of AVG_0 in its sample slot positions 9–15, that is, the set of energy signals corresponding to sample slot positions 1–7 are added to the set of energy signals corresponding to sample slot positions 9–15, and the sums are divided by two. FIG. 6 further illustrates the operation of step 78 with respect to the example of $AVG\_0_1$ to thereby produce an example of AVG_2 shown as $AVG\_2_1$. Particularly, FIG. 6 illustrates the signals at sample slot positions 1–7 of $AVG\_0_1$ (i.e., shown as $AVG\_0_1$:1–7), followed by the signals at sample slot positions 9–15 of $AVG\_0_1$ (i.e., shown as $AVG\_0_1$:9–15). Below those signals is the average of those signals, thereby forming $AVG\_2_1$, and note that $AVG\_2_1$ includes one peak, $P_{1e}$.

In addition to the preceding, step 76 identifies MAX_1 which is the magnitude of the largest peak in AVG_1 and step 76 also identifies POS_1 which is the position of MAX_1 within AVG_1. Thus, in the example of FIG. 6, step 76 identifies $P_{1c}$ as $MAX\_1_1$ and its position within $AVG\_1_1$, $POS\_1_1$, which as shown in FIG. 6 is position 1. Similarly, step 78 identifies MAX_2 which is the magnitude of the largest peak in AVG_2 and step 78 also identifies POS_2 which is the position within AVG_2 of MAX_2. Thus, in the example of FIG. 6, step 78 identifies $P_{1e}$ as $MAX\_2_1$ and its position, $POS\_2_1$, as position 1. Next, method 70 continues from steps 76 and 78 to a step 80.

Step 80 represents the operation of comparator 60 in FIG. 4 and performs a comparison, where the result of the comparison resolves the ambiguity as to whether a first peak or a second peak in AVG__0 represents the actual first SCH transmitted in a given frame. Specifically, step 80 compares MAX__1 to MAX__2, and if MAX__1 is the larger of the two then method 70 continues to step 82, whereas if MAX__2 is the larger of the two then method 70 continues to step 84. As further demonstrated below, the flow to either step 82 or step 84 is accomplished by comparator 60 of FIG. 4 by asserting the SELECT signal to a respective binary state. Once more looking to the example of FIG. 6 and recalling that MAX__$1_1$=$P_{1c}$ and MAX__$2_1$=$P_{1e}$, then a visual inspection of these peaks demonstrates that MAX__$1_1$ is the larger of the two and, hence, for this example method 70 continues to step 82.

In step 82, having been reached because MAX__1 exceeds MAX__2, then step 82 resolves that the SCH transmitted by the base station as a first SCH in a frame has been received by user station UST somewhere in $FS_1$ among sample slots 1 through 8 (as opposed to in sample slots 9 through 15). Further, step 82 identifies the actual position of the transmitted SCH within $FS_1$. Specifically, in step 82, SELECT is asserted to a state to cause multiplexers 62 and 64 to select what is shown as the lower input to each multiplexer; as a result, the outputs to adder 66 cause it to add the value of POS__1 as an offset to the fixed value 0. In the present example, recall that POS__$1_1$ should identify the sample position of peak $P_{1c}$ which, recall by way of example is assumed to be centered within slot 1; thus, peak $P_{1c}$ will occur at sample position 2,560 (i.e., half-way through the 5,120 sample positions in slot 1). Accordingly, this value is added by adder 66 to 0 for a total value, POS, equal to 2,560 and, thus, this value of POS from step 82 indicates that the actual position of the first SCH transmitted in the present frame is at sample position 2,560 of $FS_1$. Further, recall from FIG. 3 that this value of POS is further communicated to block 26 for use therein. Finally, by visually inspecting $FS_1$ as illustrated in FIG. 6, one skilled in the art may confirm that the step 82 determination is accurate, that is, that SCH in slot 1 is the first SCH transmitted in a given frame because that slot 1 SCH is followed by six non-synchronization channel slots whereas the SCH in sample slot 8 is followed by seven non-synchronization channel slots.

Figure 7:
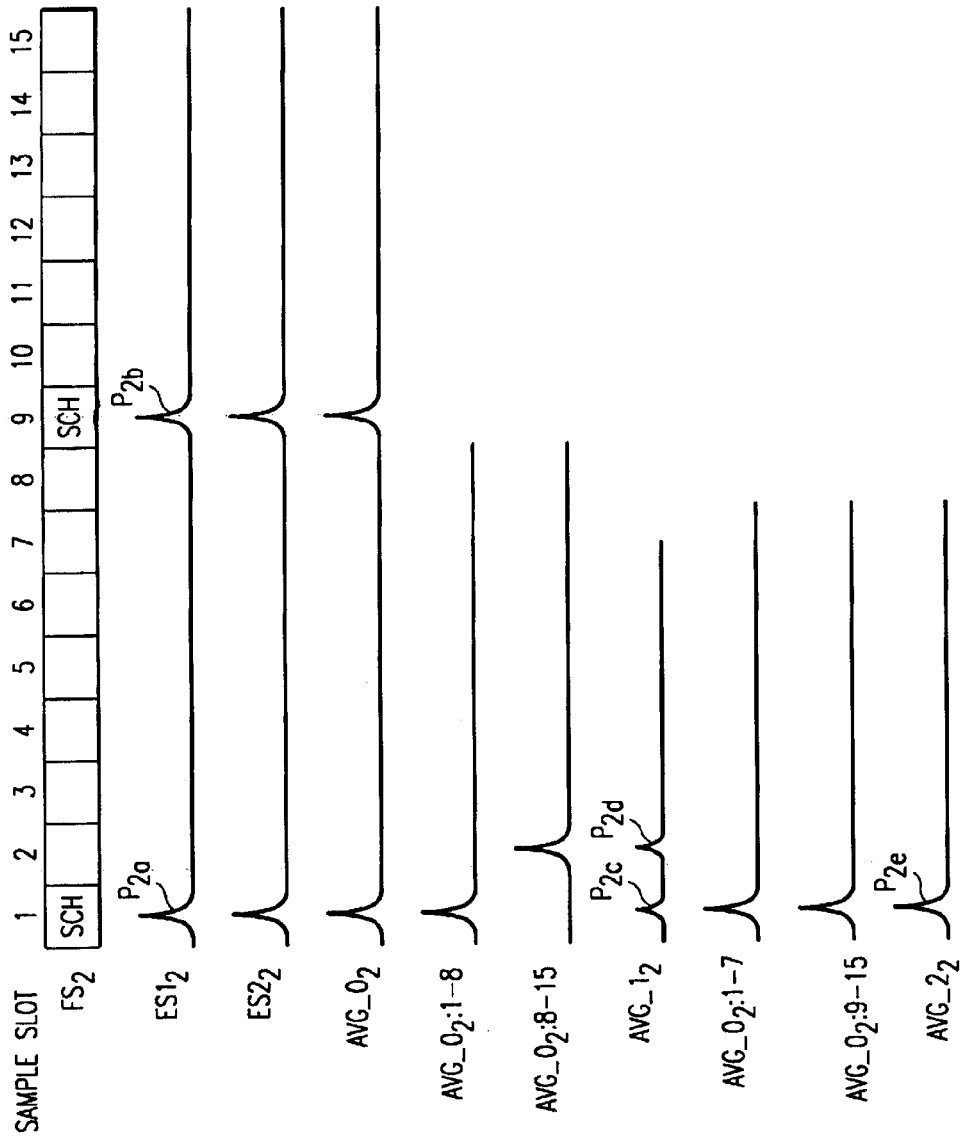
FIG. 7 illustrates a second example of signals processed according to the preferred embodiment method of FIG. 5.

In step 84, having been reached because MAX__2, exceeds MAX__1, then step 84 resolves that the SCH transmitted by the base station as a first SCH in a frame has been received by user station UST somewhere in $FS_1$ among its sample slots 9 through 15 (as opposed to in slots 1 through 8). To further illustrate this operation, FIG. 7 depicts another example of a received frame-sized set $FS_2$ of energy signals spanning a total of 15 sample slots. In the example of FIG. 7, one SCH is received in sample slot 1 and another SCH is received in sample slot 9. Again, only by way of example, assume that both of these SCHs are centered within the respective sample slots. Further, one of these two SCH occurrences is therefore the first SCH as transmitted in a given frame to user station UST; indeed, by a visual inspection of $FS_2$, one skilled in the art may conclude that the SCH in sample slot 9 is the first SCH as transmitted in a given frame because it is followed by six non-synchronization channel slots whereas the SCH in sample slot 1 is followed by seven non-synchronization channel slots. Thus, method 70 is now discussed with respect to $FS_2$ of FIG. 7 to confirm that the method reaches this proper result, and this example as detailed below makes this determination by ultimately reaching step 84.

Applying method 70 to $FS_2$ of FIG. 7, step 72 buffers a first frame-sized set of energy values shown in FIG. 7 as $ES1_2$, and step 74 combines a second framed-size set of energy values $ES2_2$ with $ES1_2$, where both sets again are shown without noise to simplify the illustration and which thereby form an average AVG__$0_2$ also shown in FIG. 7. Again, $ES1_2$ with $ES2_2$ may differ to various degrees and include some level of noise, and the preferred combination achieved in AVG__$0_2$ removes some of these effects.

Next with respect to FIGS. 5 and 7, steps 76 and 78 determine the AVG__1 and AVG__2 values based on the sample slot positions of AVG__$0_2$ shown in FIG. 7, namely, positions 1–8 are averaged with positions 8–15 to form the example of AVG__1 shown as AVG__$1_2$ in FIG. 7, while positions 1–7 are averaged with positions 9–15 to form the example of AVG__2 shown as AVG__$2_2$ in FIG. 7. Further, note that AVG__$1_2$ includes two peaks $P_{2c}$ and $P_{2d}$ while AVG__$2_2$ includes one peak $P_{2e}$. In addition to the preceding, step 76 identifies MAX__$1_2$ and POS__$1_2$ relating to the largest peak in AVG__$1_2$. In this regard, note that peaks $P_{2c}$ and $P_{2d}$ may be approximately the same magnitude because noise is not included in the illustrated ideal example; however, in an actual implementation where noise is present, one of the peaks will most likely exceed the other. As further shown below, regardless of which is chosen for purposes of defining MAX__$1_2$ and POS__$1_2$, the ultimate outcome of operation should not be negatively affected. With respect to step 78, it identifies $P_{2e}$ as MAX__$2_2$ and position POS__$2_2$ is identified as position 1. Next, method 70 continues from steps 76 and 78 to step 80.

Step 80 again compares MAX__1 to MAX__2, where in the example of FIG. 7 this comparison is of MAX__$1_2$ to MAX__$2_2$. From this comparison, the peak $P_{2e}$ of MAX__$2_2$ is found to exceed either peak $P_{2c}$ or $P_{2d}$ of MAX__$1_2$ (based on whichever was selected as described above), with the result thereby passing the method flow to step 84, and recall that step 84 was introduced by the example of FIG. 7. Looking now to the specific application of step 84 to FIG. 7, step 84 resolves that the SCH transmitted first in a given frame has been received somewhere in $FS_2$ among sample slots 9 through 15 (as opposed to in sample slots 1 through 8), and step 84 also identifies the slot position in which this first-SCH was transmitted within $FS_2$. Specifically, in step 84, SELECT is asserted to a state opposite that of step 82, where the step 84 state causes multiplexers 62 and 64 to select what is shown as the upper input to each multiplexer; as a result, the outputs to adder 66 cause it to add the value of POS__2 as an offset to the fixed 8×5,120 (i.e., 8S, where S is shown above to be the number of samples per slot). In the present example, POS__$2_2$ should identify the sample position of peak $P_{2e}$ which, because the example assumes it is centered within slot 1, it will occur at sample position 2,560 (i.e., half-way through the 5,120 sample positions); accordingly, this value is added by adder 66 to 8×5,120 for a total value, POS, equal to 43,520 (i.e., 2,560+[8×5,120]= 43,520) and, thus, this value of POS from step 82 indicates that the actual position of the first SCH transmitted in the presently analyzed frame is centered within sample slot position 9 of $FS_2$. Finally, by visually inspecting $FS_2$ as illustrated in FIG. 7, one skilled in the art may confirm that the step 84 determination is accurate, that is, that the first SCH transmitted in the present frame is the SCH in sample slot 9 because that SCH is followed by six non-synchronization channel slots whereas the SCH in sample slot 1 is followed by seven non-synchronization channel slots.

Figure 8:
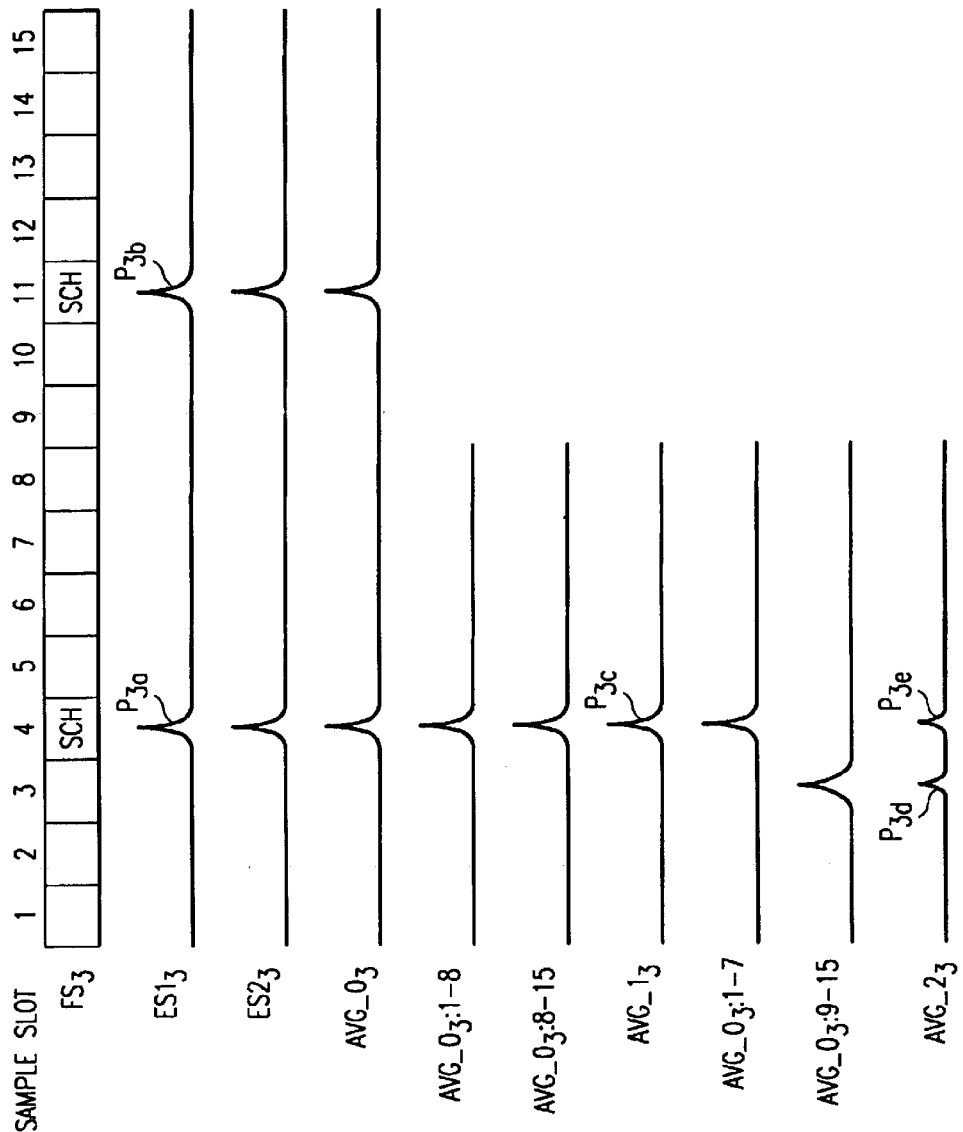
FIG. 8 illustrates a third example of signals processed according to the preferred embodiment method of FIG. 5.

As a final illustration of the operation of method 70, FIG. 8 depicts still another example of a received frame-sized set $FS_3$ of energy signals. In the example of FIG. 8, one SCH is received in sample slot 4 and another SCH is received in sample slot 11. Further, a visual inspection of $FS_3$ reveals that the SCH in sample slot 4 is the first SCH transmitted in the present frame because it is followed by six non-synchronization channel slots whereas the SCH in sample slot 11 is followed by seven non-synchronization channel slots (assuming a wraparound count back to the SCH in sample slot 4). Since method 70 has been described above with respect to other examples, then one skilled in the art should readily appreciate the following brief description of that method as applied to the example of FIG. 8.

Through step 74 two samples $ES1_3$ and $ES2_3$ are buffered and combined to form an average $AVG\_0_3$. Next, $AVG\_1_3$ is formed by averaging positions 1–8 and 8–15 of $AVG\_0_3$, while $AVG\_2_3$ is formed by averaging positions 1–7 and 9–15 of $AVG\_0_3$. The maximums and respective positions of those maximums are determined for $AVG\_1_3$ and $AVG\_2_3$ followed by step 80 determining that the largest of those maximums (i.e., peak $P_{3c}$) occurs in $AVG\_1_3$ at sample slot position 4 (i.e., $POS\_1_3=4$) and passing the flow to step 82. Step 82 thereby resolves that the first SCH as transmitted in the present frame being analyzed is in $FS_3$ among its sample slots 1 through 8, and by adding the value of $POS\_1_3$ as an offset to 0 it determines that the actual position, POS, of this first transmitted SCH. Again, assuming peak $P_{3c}$ is centered within slot 4, then its sample position, $POS\_1_3$, equals 17,920, and that value is added to 0 to indicate that POS= 17,920, that is, the first SCH transmitted by the present frame being analyzed is located at sample position 17,920 of $FS_3$ (i.e., centered with slot 4).

Having examined FIGS. 6 through 8 in connection with the preferred embodiments, various additional observations may be made with respect to the inventive scope. As a first observation, the examples of FIGS. 6 through 8 demonstrate that the preferred embodiments receive a communication sequence having an odd number of slots and with two SCH occurrences therein and use various averaging methods to identify a peak value which then identifies which of the SCH occurrences corresponds to the SCH that was transmitted as the first of two SCH's transmitted in a given frame by a base station. As a second observation, from the preceding example one skilled in the art may readily consider the many other possible sequences having different locations for the two SCH occurrences, where for each of those instances it will be confirmed that method 70 identifies in a received sequence which of two SCH's received in that sequence is the SCH transmitted in a given frame by a base station as the first SCH in that frame, and method 70 also identifies the position of that first-transmitted SCH within each such sequence. As a third observation, while a preferred embodiment is illustrated in the example of a WCDMA sequence having fifteen slots, still other communication data streams may be analyzed using the preceding inventive teachings.

Returning to FIG. 5, note that after either step 82 or step 84, method 70 concludes with a step 86. In step 86, block 26 (see FIG. 3) performs the stage 2 acquisition which is the acquisition of the SSC. More particularly, as known in the TDMA art, SSC detection is achieved by correlating the SSCs in two successive frames with a different so-called comma free code ("CFC"), where each CFC is a series of four 256 length composite codes, that is, each composite code may be three SSCs sent in parallel. For example, assume that such a given CFC may be represented by the following series of four 256-length composite codes:

$C_1, C_2, C_3, C_4$

In other words, for two successively received frames, there are a total of four composite SSCs and, thus, in the stage 2 acquisition a correlation is measured by user station UST between each successive one of the four composite CFCs and a respective one of the total of four composite SSCs.

As an additional consideration to step 86, attention is now directed to the use of the POS value from either step 82 or step 84 in FIG. 5. Specifically, recall that the POS value indicates, for a given frame width of information, which of the two SCH slots in that information corresponds to the first of two SCH's transmitted by a base station in a given frame. Since the SCH includes both a PSC and a composite SSC, then the POS indication likewise informs step 86 which of the two composite SSCs in the information was transmitted first in a given frame. This indication, therefore, reduces the required number of stage 2 correlation measures, as may be further demonstrated by way of the following example.

As an example of stage 2 correlation measures in step 86, assume that in two successive frames, the following four composite SSC are received in the order shown:

$SSC_1, SSC_2, SSC_3, SSC_4$

Further, from either step 82 or step 84, the POS value will indicate, for each pair of composite SSCs (i.e., the first pair $SSC_1$ and $SSC_2$ and the second pair $SSC_3$ and $SSC_4$), which of the composite SSCs in the pair was actually transmitted first in a given frame by a base station. For example, assume that POS indicates that $SSC_1$, the first SSC in the pair $SSC_1$ and $SSC_2$, was the first SCH transmitted in the given frame; thus, it also follows therefore that $SSC_3$, the first SSC in the pair $SSC_3$ and $SSC_4$, also was transmitted first in another frame. As a result, step 86 performs the following two CFC correlation measures shown in Table 1:

TABLE 1

| Correlation number | composite $SSC_1$ | composite $SSC_2$ | composite $SSC_3$ | composite $SSC_4$ |
|---|---|---|---|---|
| 1 | $C_1$ | $C_2$ | $C_3$ | $C_4$ |
| 2 | $C_3$ | $C_4$ | $C_1$ | $C_2$ |

Correlation number 1 in Table 1 is a straightforward correlation given the knowledge that $SSC_1$ was transmitted as a first of two codes in a given frame, that is, then the CFC in correlation number 1 (i.e., $C_1, C_2, C_3, C_4$) is correlated to the SSCs as received in the two successive frames. However, because the CFC is presented along two frames, at this point in the method there is the possibility that $SSC_1$ and $SSC_2$ were transmitted in a second frame of a pair of frames rather than in a first frame of a pair of frames. Thus, the correlation number 2 shown in Table 1 is also performed in step 86 whereby the second pair of CFC codes (i.e., $C_3$ and $C_4$) in the CFC sequence are correlated with the SSCs in the first received frame (i.e., $SSC_1$ and $SSC_2$), while the first pair of CFC codes (i.e., $C_1$ and $C_2$) are correlated with the SSCs in the second received frame (i.e., $SSC_3$ and $SSC_4$). Once the correlations measures are complete, the strongest correlation is deemed to correspond to a proper detection of the SSCs and, thus, completes the SSC acquisition.

Figure 9:
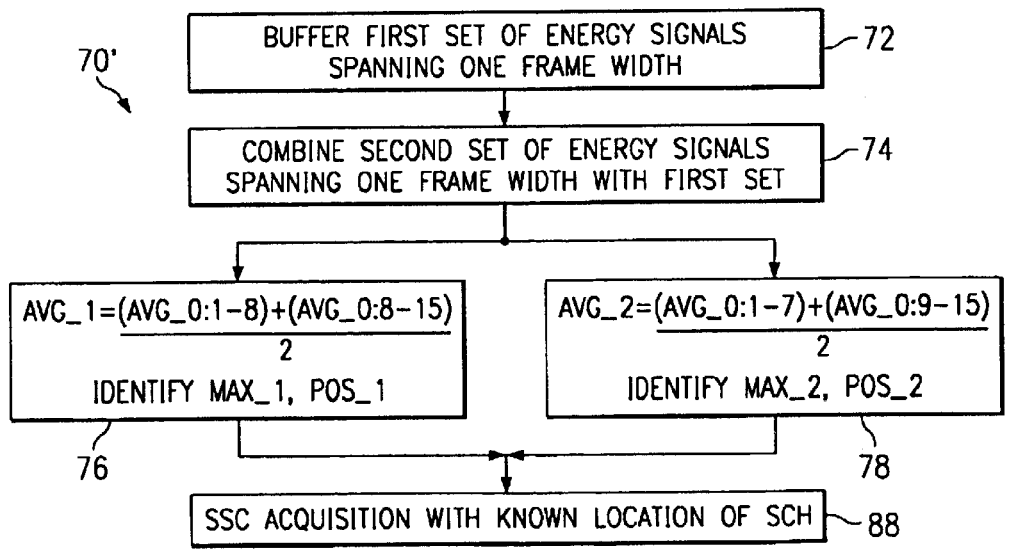
FIG. 9 illustrates an alternative method 70' of operation of stage 1 acquisition block 24 and the stage 2 acquisition of block 26 of FIG. 4.

FIG. 9 illustrates an alternative method 70' of operation of stage 1 acquisition block 24 and the stage 2 acquisition of block 26 of FIG. 4. Method 70' includes the same steps 72 through 78 of method 70 from FIG. 5; however, following steps 76 and 78, method 70' proceeds to a step 88. Thus, in method 70', the values of $POS\_1$ and $POS\_2$ are both used in step 88 rather than being compared by an intermediate step as is the case in method 70. Further, to embody this approach in user station UST of FIG. 4, then comparator 60, multiplexers 62 and 64, and adder 66 are removed, and the values of $POS\_1$ and $POS\_2$ are passed as the output POS to block 26. The specific operation of step 88 is discussed immediately below.

In step 88, block 26 performs the stage 2 SSC acquisition, again using correlation measures by correlating the SSCs in two successive of frames with CFCs. Using the example provided above, assume again therefore that the CFC is represented by the following series of four 256-length composite codes:

$C_1, C_2, C_3, C_4$

However, because step 88 has two different positions provided by POS (i.e., POS_1 and POS_2), then step 88 requires more correlation measures as compared to step 86 in method 70. Specifically, because the POS value indicates both POS_1 and POS_2, then at the time step 88 is reached then the SCH positions have been determined for a frame width of information, but there has not been a determination of which of the two SCH slots in that information was transmitted as a first SCH in a given frame. This status, therefore, increases the required number of stage 2 correlation measures as compared to method 70 described above, as may be further demonstrated by way of the following example.

As an example of stage 2 correlation measures in step 88, assume again that in two successive frames, the following four composite SSCs are received in the order shown:

$SSC_1, SSC_2, SSC_3, SSC_4$

However, because it is not known which code was transmitted first in the pair of codes transmitted in a given frame, then any one of the four SSCs may represent such a first-transmitted code. In other words, POS_1 and POS_2 indicate the slot positions of two SCHs per one frame width of information (and thereby the respective SSCs in those SCHs), but at this point there is no indication as to which of those positions was transmitted first in a frame. As a result, step 88 performs the following four CFC correlation measures shown in Table 2:

TABLE 2

| Correlation number | composite $SSC_1$ | composite $SSC_2$ | composite $SSC_3$ | composite $SSC_4$ |
|---|---|---|---|---|
| 1 | $C_1$ | $C_2$ | $C_3$ | $C_4$ |
| 2 | $C_4$ | $C_1$ | $C_2$ | $C_3$ |
| 3 | $C_3$ | $C_4$ | $C_1$ | $C_2$ |
| 4 | $C_2$ | $C_3$ | $C_4$ | $C_1$ |

Correlation number 1 in Table 2 is measured given the possibility that $SSC_1$ was transmitted as part of the first of four SCHs in two successive frames. However, there exists three other possibilities, that is, that any of $SSC_2$, $SSC_3$, or $SSC_4$ was received as part of the first of four SCHs in two successive frames. Accordingly, correlations numbers 2 through 4 of Table 2 correspond to these respective possible scenarios.

Having detailed both methods 70 and 70', note that the selection between one over the other may be left to one skilled in the art based on various considerations. For example, the total time for stage 1 and stage 2 acquisition, $T_{acq}$, is in general a non-linear function of $T_1$, $T_2$, $T_3$, $P_{d1}$, $P_{d2}$, and $P_{d3}$, where $T_1$ is the time for stage 1 acquisition, $T_2$ is the time for stage 2 acquisition, $T_3$ is the time for stage 3 acquisition, $P_{d1}$ is the probability of detection in stage 1, $P_{d2}$ is the probability of detection in stage 2, and $P_{d3}$ is the probability of detection in stage 3. Also $P_{d1}$ and $P_{d2}$ are non-linear and typically $P_{d1}$ is much less than $P_{d2}$. Therefore, in some instances it may be desirable to reduce $T_1$ to offset the aspect that $P_{d1}$ is relatively small. In this regard, method 70' accomplishes such a reduction of $T_1$ relative to method 70; in other words, while method 70' requires additional correlation measures over method 70 as shown by a comparison of Tables 2 and 1, respectively, the time for these measures thereby increases $T_2$ while $T_1$ is also reduced because the comparison and ambiguity resolution of steps 80, 82, and 84 from method 70 are eliminated in method 70'. As a result, while additional time is shifted from $T_1$ to $T_2$, the total acquisition time $T_{acq}$ may be reduced. Thus, these as well as other considerations ascertainable by one skilled in the art may lead to the selection of either method 70 or 70'.

From the above, it may be appreciated that the above embodiments provide an improved system and method for identifying a synchronization channel with a sequence of received slots. The preceding also has demonstrated various alternatives that are within the present inventive scope. Indeed, in addition to the various options provided above, still others are contemplated within the present inventive scope. For example, while the preceding example is applied in the context of user station synchronization, one skilled in the art may possibly adapt these teachings to synchronization by a base station. As another example, while the preferred embodiment has application to CDMA (i.e., WCDMA), and the TDD data transfer technique thereof, the present teachings may apply to other wireless communication formats. Indeed, the previous example has illustrated one TDD mode wherein the synchronization channel is located in two slots of a frame; however, the preferred embodiment may operate with other modes such as mode 1 of TDD wherein the synchronization channel is located in only one slot per frame in which case only one average need be taken or, if two averages are taken, the preferred embodiment will still properly identify the synchronization channel from the larger peak of the two averages. As still another example, while method 70 preferably forms AVG_0 to remove noise and then uses its signals to generate AVG_1 and AVG_2, in an alternative embodiment AVG_1 and AVG_2 could be determined directly from the set FS without the benefit of the first averaging to remove noise. As still another example, while method 70 preferably forms AVG_0 by averaging two sets of signals, in still another embodiment a greater number of signal sets may be combined to form AVG_0. As still another example, while the preferred embodiment focuses on only a single maximum peak for each of AVG_1 and AVG_2, in other embodiments a larger number of peaks per each of AVG_1 and AVG_2 may be processed; for example, to respond further to the possibility of multipaths, two peaks per each of AVG_1 and AVG_2 may be passed to the stage 2 acquisition. As yet a final example, while the present teachings are applied to a 15 slot frame, other data formats wherein a synchronization channel is located in a frame or comparable data format which is divided into an odd number of portions may benefit from the present inventive teachings. Consequently, while the present embodiments have been described in detail, various substitutions, modifications or alterations could be made to the descriptions set forth above without departing from the inventive scope which is defined by the following claims.

What is claimed is:

1. A method of operating a wireless receiver, comprising the steps of:

receiving a wireless communicated signal, wherein the signal comprises asymmetrically spaced synchronization channel components;

defining a set of signals from the communicated signal, wherein the set spans a number of equal duration time slots and comprises at least a first synchronization channel component and a second synchronization channel component;

forming a first signal combination by combining a first portion of the set of signals with a second portion of the set of signals;

forming a second signal combination by combining a third portion of the set of signals with a fourth portion of the set of signals; and detecting a location of the first synchronization channel component and a location of the second synchronization channel component in response to at least one of the first and second signal combinations.

2. The method of claim 1 wherein the step of defining comprises the steps of:

defining a first sample set of signals from the communicated signal, wherein the first sample set spans the number of equal duration time slots;

defining a second sample set of signals from the communicated signal, wherein the second sample set spans the number of equal duration time slots; and averaging at least the first sample set with the second sample set to form the set of signals.

3. The method of claim 2 wherein the step of averaging comprises forming a sum by adding the first sample set to the second set.

4. The method of claim 3 wherein the step of averaging further comprises dividing the sum by two.

5. The method of claim 2 wherein the step of averaging comprises forming a scaled average.

6. The method of claim 2 wherein the step of averaging comprises forming a single pole average.

7. The method of claim 2:

wherein the set of signals spans an odd number N of the equal duration time slots;

wherein the odd number N of the equal duration time slots may be referenced by an ascending position numbers 1 through N;

wherein the step of forming a first signal combination comprises combining a first portion of the set of signals existing in positions 1 through X of the set of signals with a second portion of the set of signals existing in positions X through N of the set of signals; and wherein the step of forming a second signal combination comprises combining a third portion of the set of signals existing in positions 1 through X−1 of the set of signals with a fourth portion of the set of signals existing in positions X+1 through N of the set of signals.

8. The method of claim 7 wherein N equals 15 and wherein X equals 8.

9. The method of claim 2:

wherein each of the synchronization channel components comprises a primary synchronization code; and wherein the step of defining a set of signals from the communicated signal comprises forming a correlation signal by correlating a known primary synchronization code value with the communicated signal.

10. The method of claim 9 wherein the set of signals comprises an energy measurement of the correlation signal.

11. The method of claim 10:

wherein the first signal combination is responsive to the energy measurement, and further comprising the step of detecting a first peak magnitude in the energy measurement and a corresponding first peak magnitude position of the first signal; and wherein the second signal combination is responsive to the energy measurement, and further comprising the step of detecting a second peak magnitude in the energy measurement and a corresponding second peak magnitude position of the second signal.

12. The method of claim 11 wherein the wireless communicated signal is received by the wireless receiver in response to a base station transmitting a frame, and further comprising the step of determining which of the first synchronization channel component and the second synchronization channel component corresponds to a first of two synchronization channel components transmitted in a given frame by the base station.

13. The method of claim 12 wherein the determining step is responsive to which of the first peak magnitude and the second peak magnitude is a maximum.

14. The method of claim 12:

wherein each of the synchronization channel components comprises a secondary synchronization code; and further comprising, in response to the detecting step, the step of correlating a plurality of comma free codes with the secondary synchronization code in the first synchronization channel component and the second synchronization channel component.

15. The method of claim 1:

wherein each of the synchronization channel components comprises a primary synchronization code; and wherein the step of defining a set of signals from the communicated signal comprises forming a correlation signal by correlating a known primary synchronization code value with the communicated signal.

16. The method of claim 15 wherein the set of signals comprises an energy measurement of the correlation signal.

17. The method of claim 16:

wherein the first signal combination is responsive to the energy measurement, and further comprising the step of detecting a first peak magnitude in the energy measurement and a corresponding first peak magnitude position of the first signal; and wherein the second signal combination is responsive to the energy measurement, and further comprising the step of detecting a second peak magnitude in the energy measurement and a corresponding second peak magnitude position of the second signal.

18. The method of claim 17 wherein the wireless communicated signal is received by the wireless receiver in response to a base station transmitting a frame, and further comprising the step of determining which of the first synchronization channel component and the second synchronization channel component corresponds to a first of two synchronization channel components transmitted in a given frame by the base station.

19. The method of claim 18 wherein the determining step is responsive to which of the first peak magnitude and the second peak magnitude is a maximum.

20. The method of claim 18:

wherein each of the synchronization channel components comprises a secondary synchronization code; and further comprising, in response to the detecting step, the step of correlating a plurality of comma free codes with the secondary synchronization code in the first synchronization channel component and the second synchronization channel component.

21. The method of claim 1 and further comprising the step of determining which of the first synchronization channel component and the second synchronization channel component corresponds to a beginning of transmitted frame slot.

22. The method of claim 1 wherein the wireless receiver comprises a user station wireless receiver.

23. The method of claim 1 wherein the step of receiving a wireless communicated signal comprises receiving a CDMA TDD wireless communicated signal.

24. A wireless receiver, comprising:
circuitry for receiving a wireless communicated signal, wherein the signal comprises asymmetrically spaced synchronization channel components;
circuitry for defining a set of signals from the communicated signal, wherein the set spans a number of equal duration time slots and comprises at least a first synchronization channel component and a second synchronization channel component;
circuitry for forming a first signal combination by combining a first portion of the set of signals with a second portion of the set of signals;
circuitry for forming a second signal combination by combining a third portion of the set of signals with a fourth portion of the set of signals; and
circuitry for detecting a location of the first synchronization channel component and a location of the second synchronization channel component in response to at least one of the first and second signal combinations.

25. The wireless receiver of claim 24 wherein the circuitry for defining comprises:
circuitry for defining a first sample set of signals from the communicated signal, wherein the first sample set spans the number of equal duration time slots;
circuitry for defining a second sample set of signals from the communicated signal, wherein the second sample set spans the number of equal duration time slots; and
circuitry for averaging at least the first sample set with the second sample set to form the set of signals.

26. The wireless receiver of claim 25 wherein the circuitry for averaging comprises circuitry for forming a sum by adding the first sample set to the second set.

27. The wireless receiver of claim 26 wherein the circuitry for averaging further comprises circuitry for dividing the sum by two.

28. The wireless receiver of claim 25 wherein the circuitry for averaging comprises circuitry for forming a scaled average.

29. The wireless receiver of claim 25 wherein the circuitry for averaging comprises circuitry for forming a single pole average.

30. The wireless receiver of claim 24:
wherein the set of signals spans an odd number N of the equal duration time slots;
wherein the odd number N of the equal duration time slots may be referenced by an ascending position numbers 1 through N;
wherein the circuitry for forming a first signal combination comprises circuitry for combining a first portion of the set of signals existing in positions 1 through X of the set of signals with a second portion of the set of signals existing in positions X through N of the set of signals; and
wherein the circuitry for forming a second signal combination comprises circuitry for combining a third portion of the set of signals existing in positions 1 through X−1 of the set of signals with a fourth portion of the set of signals existing in positions X+1 through N of the set of signals.

31. The wireless receiver of claim 30 wherein N equals 15 and wherein X equals 8.

32. The wireless receiver of claim 24:
wherein each of the synchronization channel components comprises a primary synchronization code; and
wherein the circuitry for defining a set of signals from the communicated signal comprises circuitry for forming a correlation signal by correlating a known primary synchronization code value with the communicated signal.

33. The wireless receiver of claim 32 wherein the set of signals comprises an energy measurement of the correlation signal.

34. The wireless receiver of claim 33:
wherein the first signal combination is responsive to the energy measurement, and further comprising circuitry for detecting a first peak magnitude in the energy measurement and a corresponding first peak magnitude position of the first signal; and
wherein the second signal combination is responsive to the energy measurement, and further comprising circuitry for detecting a second peak magnitude in the energy measurement and a corresponding second peak magnitude position of the second signal.

35. The wireless receiver of claim 34 wherein the wireless communicated signal is received by the wireless receiver in response to a base station transmitting a frame, and further comprising circuitry for determining which of the first synchronization channel component and the second synchronization channel component corresponds to a first of two synchronization channel components transmitted in a given frame by the base station.

36. The wireless receiver of claim 35 wherein the circuitry for determining is responsive to which of the first peak magnitude and the second peak magnitude is a maximum.

37. The wireless receiver of claim 35:
wherein each of the synchronization channel components comprises a secondary synchronization code; and
further comprising, in response to the circuitry for detecting, circuitry for correlating a plurality of comma free codes with the secondary synchronization code in the first synchronization channel component and the second synchronization channel component.

* * * * *